(12) United States Patent
Xu

(10) Patent No.: US 11,264,716 B2
(45) Date of Patent: Mar. 1, 2022

(54) ACTUATOR GEARBOX WITH SELECTABLE LINKAGES

(71) Applicant: CommScope Technologies LLC, Hickory, NC (US)

(72) Inventor: HanXing Xu, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 793 days.

(21) Appl. No.: 16/097,740

(22) PCT Filed: May 9, 2017

(86) PCT No.: PCT/US2017/031705
§ 371 (c)(1),
(2) Date: Oct. 30, 2018

(87) PCT Pub. No.: WO2017/196811
PCT Pub. Date: Nov. 16, 2017

(65) Prior Publication Data
US 2020/0388915 A1    Dec. 10, 2020

(30) Foreign Application Priority Data

May 13, 2016    (CN) .......................... 201610319613.0

(51) Int. Cl.
*H01Q 3/30* (2006.01)
*F16D 11/10* (2006.01)
(Continued)

(52) U.S. Cl.
CPC ............... *H01Q 3/32* (2013.01); *F16D 11/10* (2013.01); *F16H 1/222* (2013.01); *F16H 25/20* (2013.01);
(Continued)

(58) Field of Classification Search
CPC H01Q 1/22; H01Q 1/246; H01Q 3/30; H01Q 3/32; F16H 37/06; F16H 1/20;
(Continued)

(56) References Cited

U.S. PATENT DOCUMENTS 5,694,812 A    12/1997    Maue et al.
6,126,132 A    10/2000    Maue
(Continued)

FOREIGN PATENT DOCUMENTS

CN    104810619    7/2015
EP    2359028    8/2011
(Continued)

OTHER PUBLICATIONS

International Search Report and Written Opinion of the International Searching Authority, International Application No. PCT/US2017/031705, dated Jul. 19, 2017, 10 pp.
(Continued)

*Primary Examiner* — Blane J Jackson
(74) *Attorney, Agent, or Firm* — Myers Bigel, P.A.

(57) ABSTRACT

An actuator gearbox includes a drive shaft including a plurality of gear linkages that are spaced apart along the drive shaft, and a plurality of output shafts adjacent respective ones of the plurality of gear linkages. Each of the gear linkages includes a fixed gear coupled to one of the plurality of output shafts and a moving gear that is slideably coupled to the drive shaft. A bias spring is coupled to the moving gear to urge the moving gear out of engagement with the fixed gear. The mechanical switch moves the moving gear into engagement with the fixed gear on the output shaft adjacent the linkage to thereby cause the output shaft to rotate in response to rotation of the drive shaft.

20 Claims, 6 Drawing Sheets

(51) Int. Cl.
*F16H 1/20* (2006.01)
*H01Q 3/32* (2006.01)
*F16H 1/22* (2006.01)
*F16H 25/20* (2006.01)
*H01P 1/18* (2006.01)
*H01Q 1/24* (2006.01)
*H02K 7/06* (2006.01)
*H02K 7/08* (2006.01)
*H02K 7/116* (2006.01)
*F16D 121/14* (2012.01)
*F16D 125/32* (2012.01)
*F16D 125/40* (2012.01)
*F16D 125/64* (2012.01)

(52) U.S. Cl.
CPC .............. *H01P 1/184* (2013.01); *H01Q 1/246* (2013.01); *H02K 7/06* (2013.01); *H02K 7/08* (2013.01); *H02K 7/116* (2013.01); *F16D 2121/14* (2013.01); *F16D 2125/32* (2013.01); *F16D 2125/40* (2013.01); *F16D 2125/64* (2013.01); *F16H 2025/204* (2013.01); *F16H 2025/2046* (2013.01); *F16H 2025/2071* (2013.01); *F16H 2025/2084* (2013.01); *F16H 2025/2093* (2013.01)

(58) Field of Classification Search
CPC .......... F16H 1/222; F16H 25/18; F16H 25/20; F16D 11/08; F16D 11/10; H01P 1/184
See application file for complete search history.

(56) References Cited

U.S. PATENT DOCUMENTS

| | | | |
|---|---|---|---|
| 7,170,466 B2 * | 1/2007 | Janoschka | H01P 1/184 |
| | | | 333/156 |
| 8,674,788 B2 | 3/2014 | Le | |
| 8,789,671 B2 * | 7/2014 | Chevalier | B60N 2/0232 |
| | | | 192/48.7 |
| 10,374,291 B2 * | 8/2019 | Schmutzler | G08C 19/40 |
| 2002/0113750 A1 | 8/2002 | Heinz et al. | |
| 2007/0140772 A1 | 6/2007 | Baringa | |
| 2007/0241979 A1 * | 10/2007 | Yang | H01Q 1/246 |
| | | | 343/765 |
| 2010/0201590 A1 * | 8/2010 | Girard | H01Q 3/32 |
| | | | 343/766 |
| 2013/0063225 A1 | 3/2013 | Deng et al. | |
| 2013/0307728 A1 * | 11/2013 | Berger | H01Q 3/32 |
| | | | 342/374 |
| 2016/0134007 A1 | 5/2016 | Ding et al. | |

FOREIGN PATENT DOCUMENTS

WO       2009127839        10/2009
WO    WO-2009102775 A3 *  1/2010  .............. H01Q 3/32

OTHER PUBLICATIONS

Extended European Search Report dated Dec. 9, 2019 for corresponding European Application No. 17796669.4 (15 pages).
International Preliminary Report on Patentability, International Application No. PCT/US2017/031705, dated Nov. 13, 2018, 8 pp.

* cited by examiner

ACTUATOR GEARBOX WITH SELECTABLE LINKAGES

CROSS-REFERENCE TO RELATED APPLICATIONS

This application is a 35 U.S.C. § 371 national stage application of PCT Application No. PCT/US2017/031705, filed on May 9, 2017, which itself claims priority from and the benefit of Chinese Patent Application No. 201610319613.0, filed May 13, 2016, the disclosures of both of which are hereby incorporated herein in their entireties. The above-referenced PCT Application was published in the English language as International Publication No. WO 2017/196811 A1 on Nov. 16, 2017.

BACKGROUND

The inventive concepts disclosed herein relate to communication systems and components, and in particular to gearboxes for configuring base station antennas.

Base station antennas for wireless communication systems transmit RF signals over long distances. A base station antenna has a characteristic radiation pattern that defines the optimum direction for transmitting/receiving signals. Early base station antennas could be configured to have a fixed radiation pattern by means of mechanical adjustments. When the antenna was installed, a technician would configure the antenna to have a desired pattern, for example, by manually adjusting the phase of each feed element of the antenna. However, reconfiguring an antenna after deployment, such as to account for changed environmental conditions, may be difficult, expensive and time-consuming.

More recently, base station antenna and related positioning systems have been developed that allow an antenna position to be configurable in the field through remote electro-mechanical control. For example, antenna systems have been developed for which settings such as the down tilt angle, beam width and/or azimuth of the antenna are remotely controllable. Such antennas may be referred to as remote electrical tilt (RET) antennas. RET antennas allow wireless network operators to remotely control the beam attributes of the antenna through the use of electromechanical sensors and actuators. Typically, the RET antenna beam attributes are adjusted using motors or actuators according to specifications promulgated by the Antenna Interface Standards Group (AISG).

SUMMARY

An actuator gearbox according to some embodiments includes a drive shaft extending in a first direction and comprising a plurality of gear linkages that are spaced apart along the drive shaft in the first direction, and a plurality of output shafts adjacent respective ones of the plurality of gear linkages. Each of the plurality of linkages includes a fixed gear coupled to a respective one of the plurality of output shafts, a moving gear that is slideably coupled to the drive shaft, wherein the moving gear is movable along a first axis of the drive shaft and rotates about the first axis in response to rotation of the drive shaft, a mechanical switch adjacent the moving gear, and a bias spring coupled to the moving gear and configured to urge the moving gear out of engagement with the one of the plurality of fixed gears that is proximate the gear linkage. The mechanical switch is configured to move the moving gear into engagement with the fixed gear on the one of the plurality of output shafts adjacent the linkage to thereby cause the one of the plurality of output shafts to rotate in response to rotation of the drive shaft.

The actuator gearbox may further include a linear actuator adjacent the drive shaft, and a switch block coupled to the linear actuator. The linear actuator is configured to move the switch block in the first direction to selectively actuate one of the plurality of mechanical switches.

Each of the mechanical switches may include a first arm proximate the linear actuator, a second arm proximate the moving gear and a pivot axis between the first arm and the second arm.

The switch block may include a cam configured to push the first arm toward the drive shaft when the switch block is positioned adjacent the first arm by the linear actuator, and wherein second arm is configured to push against the moving gear when the first arm is pushed toward the drive shaft by the cam to urge the moving gear into engagement with a respective one of the fixed gears.

The linear actuator may include a switch screw that includes a helical groove therein, and wherein the switch block includes a nut that is positioned on the switch screw and that engages the helical groove on the switch screw so that when the switch screw is rotated, the nut moves along the first direction.

The linear actuator may include a linear guide that guides the nut in the first direction when the switch screw is rotated.

The actuator gearbox may further include a drive motor coupled to the drive shaft through a drive shaft gear linkage and a switch motor coupled to the switch screw through a switch screw gear linkage.

The actuator gearbox may further include a motor controller on a printed circuit board coupled to the drive motor and the switch motor and configured to control the drive motor and the switch motor.

Each of the plurality of output shafts may include a lead screw including a second helical groove therein, a second nut on the output shaft that engages the second helical groove on the lead screw so that when the output shaft is rotated, the nut moves along a second direction that is different from the first direction, and a linkage shaft coupled to the second nut.

The actuator gearbox may further include a base, wherein the drive shaft and the plurality of output shafts are mounted to the base by a plurality of support bearings.

A base station antenna system according to some embodiments includes a base station antenna, and an actuator gearbox. The actuator gearbox includes a drive shaft extending in a first direction and including a plurality of gear linkages that are spaced apart along the drive shaft in the first direction, and a plurality of output shafts adjacent respective ones of the plurality of gear linkages. At least one of the plurality of output shafts is coupled to the base station antenna, and at least one setting of the base station antenna is controlled in response to motion of the at least one of the plurality of output shafts.

Each of the plurality of linkages includes a fixed gear coupled to a respective one of the plurality of output shafts, a moving gear that is slideably coupled to the drive shaft, wherein the moving gear is movable along a first axis of the drive shaft and rotates about the first axis in response to rotation of the drive shaft, a mechanical switch adjacent the moving gear, and a bias spring coupled to the moving gear and configured to urge the moving gear out of engagement with the one of the plurality of fixed gears that is proximate the gear linkage. The mechanical switch is configured to move the moving gear into engagement with the fixed gear on the one of the plurality of output shafts adjacent the linkage to thereby cause the one of the plurality of output shafts to rotate in response to rotation of the drive shaft.

The at least one setting of the base station antenna may include a phase shift, downtilt angle, an azimuth and/or a beam width of the base station antenna.

The base station antenna system may further include a second base station antenna, wherein a second one of the plurality of output shafts is coupled to the second base station antenna and wherein at least one setting of the second base station antenna is controlled in response to motion of the second one of the plurality of output shafts.

The at least one setting of the second base station antenna may include a phase shift, downtilt angle, an azimuth and/or a beam width of the second base station antenna.

An actuator gearbox according to further embodiments includes a drive shaft extending in a first direction and including a plurality of gear linkages that are spaced apart along the drive shaft in the first direction, a motor coupled to the drive shaft, a motor controller coupled to the motor, a linear actuator adjacent the drive shaft, and a switch block coupled to the linear actuator.

Each of the plurality of linkages may include an output gear, a moving gear that is slideably coupled to the drive shaft, wherein the moving gear is movable along a first axis of the drive shaft and rotates about the first axis in response to rotation of the drive shaft, and a mechanical switch adjacent the moving gear. The mechanical switch is configured to move the moving gear into engagement with the output gear to thereby cause the output gear to rotate in response to rotation of the drive shaft, and the linear actuator is configured to move the switch block into contact with the mechanical switch to selectively actuate the mechanical switch.

Each of the mechanical switches may include a first arm proximate the linear actuator, a second arm proximate the moving gear and a pivot axis between the first arm and the second arm.

The switch block may include a cam configured to push the first arm toward the drive shaft when the switch block is positioned beneath the first arm by the linear actuator, and the second arm may be configured to push against the moving gear when the first arm is pushed toward the drive shaft by the cam to urge the moving gear into engagement with a respective ones of the fixed gears.

The linear actuator may include a switch screw that includes a helical groove therein, and wherein the switch block includes a nut that is positioned on the switch screw and that engages the helical groove on the switch screw so that when the switch screw is rotated, the nut moves along the first direction.

The linear actuator may include a linear guide that guides the nut in the first direction when the switch screw is rotated.

The actuator gearbox may further include a plurality of output shafts adjacent respective ones of the plurality of gear linkages, wherein the output gears are affixed to respective ones of the plurality of output shafts.

DETAILED DESCRIPTION OF EMBODIMENTS

The present inventive concepts are described with reference to the accompanying drawings, in which certain embodiments of the invention are shown. The inventive concepts may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Embodiments of the inventive concepts provide actuator gearbox systems, and base stations antennas including an actuator gearbox system. An actuator gearbox system according to some embodiments may be used for a multi-antenna phase shifter. That is, a gearbox system according to some embodiments may be used to control various settings of a remote electrical tilt (RET) antenna or settings of multiple RET antennas.

As noted above, various physical and/or electrical settings of a RET antenna, such as the downtilt angle, the azimuth and/or the beam width, can be remotely controlled by means of electromechanical actuators. In previous antenna systems, each setting of the antenna may be controlled by a separate actuator. Moreover, in multi-antenna systems, each antenna may require a separate actuator or set of actuators to control various settings of the antennas.

Figure 1:
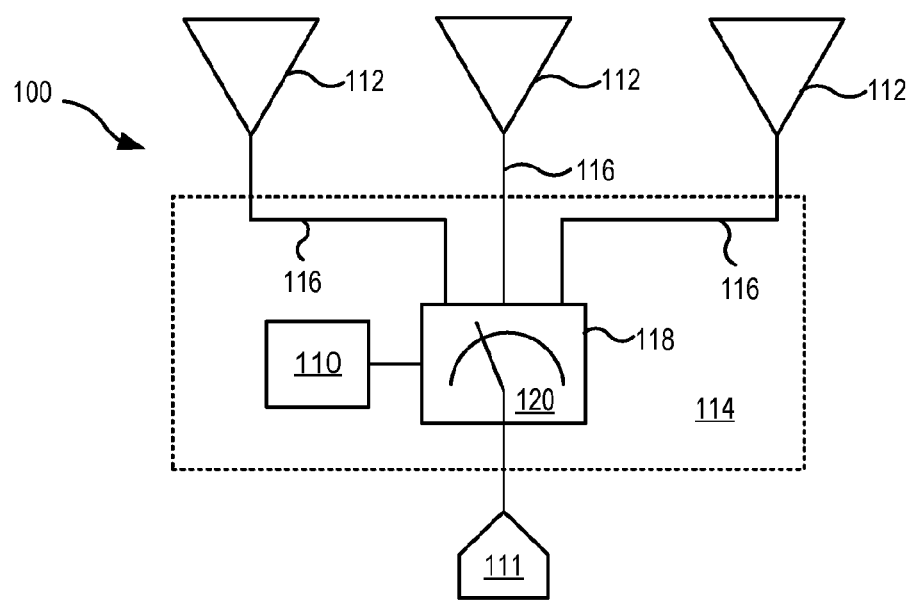
FIG. 1 is a schematic diagram of a panel antenna including a feed network that can be controlled by a gearbox system according to some embodiments.

Reference is now made to the drawings, in which like numbers refer to like elements. Referring to FIG. 1, a base station antenna array 100 may include an input 111, a plurality of radiating elements 112 and a feed network 114 coupling the input 111 to the radiating elements 112. The feed network 114 may include a plurality of transmission lines 116 and one or more variable elements 118. The transmission lines 116 have nominal impedance which may be selected to match an impedance of an RF line that couples the antenna array 100 to a Low Noise Amplifier (not shown). The transmission lines 116 may be implemented as microstrip transmission lines, coaxial cables, or other impedance-controlled transmission media. The variable elements 118 may include one or more phase shifters, power dividers, a combination of the two, or another type of variable element.

In particular, the variable elements 118 may include rotating wiper-type phase shifters 120 connected to the transmission lines 116 and the input 111. The phase shift imparted by the phase shifter 120 may be controlled by a mechanical positioning system 110 that physically changes the position of the rotating wiper in the phase shifter 120.

Figure 2:
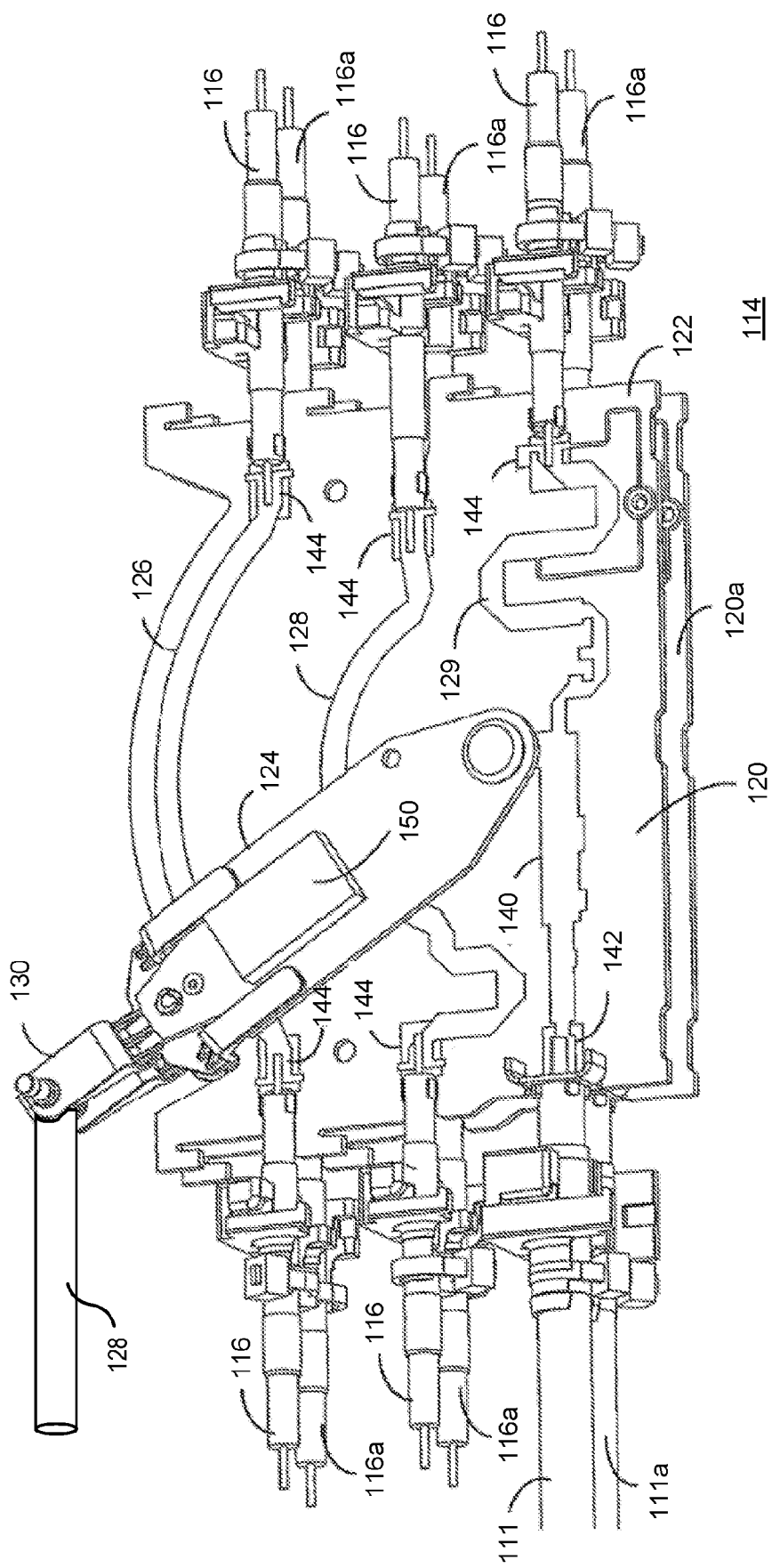
FIG. 2 illustrates an example of an antenna phase shifter that can be controlled by a gearbox system according to some embodiments.

Referring to FIG. 2, a rotating wiper-type phase shifter 120 may be implemented with first and second printed circuit boards (PCBs). For example, the first PCB may include a stationary PCB 122, and the second PCB may include a rotatable wiper PCB 124.

The position of the rotatable wiper PCB 124 is controlled by the position of a linkage shaft 128 that is coupled to the rotatable wiper PCB 124 via a mechanical linkage. A position sensor 150 may be provided on the rotatable wiper PCB 124 to detect the position of the rotatable wiper PCB 124.

The stationary PCB 122 includes a plurality of transmission line traces 126, 128. The transmission line traces 126, 128 are generally arcuate. The transmission line traces 126, 128 may be disposed in a serpentine pattern to achieve a longer effective length. In the example illustrated in FIG. 2, there are two transmission line traces 126, 128 on the stationary PCB 122, one transmission line trace 126 being disposed along an outer circumference of a PCB 122, and one transmission line trace 128 being disposed on a shorter radius concentrically within the outer transmission line trace 126. A third transmission line trace 129 connects an input on the stationary PCB 122 to an unshifted output.

The stationary PCB 122 may include one or more input traces 140 leading from an input pad 142 near an edge of the stationary PCB 122 to the position where the pivot of the wiper PCB 124 is located. (The use of "input" and "output" herein refers to the radio frequency signal path of transmitted signals. Radio frequency signals received by the antenna flow in the reverse direction.) Electrical signals on an input trace 140 are coupled to the wiper PCB 124. The wiper PCB 124 couples the electrical signals to the transmission line traces 126, 128. Transmission line traces 126, 128 may be coupled to output pads 144 to which a coaxial cable may be connected. Alternatively, the stationary PCB 122 may be coupled to stripline transmission lines on a panel without additional coaxial cabling. As the wiper PCB 124 moves, an electrical length from the wiper PCB 124 to each radiating element served by the transmission lines 126, 128 changes. For example, as the wiper PCB 24 moves to shorten the electrical length from the input transmission line trace 140 to a first radiating element, the electrical length from the input transmission line trace end to a second radiating element increases by a corresponding amount.

Figure 3:
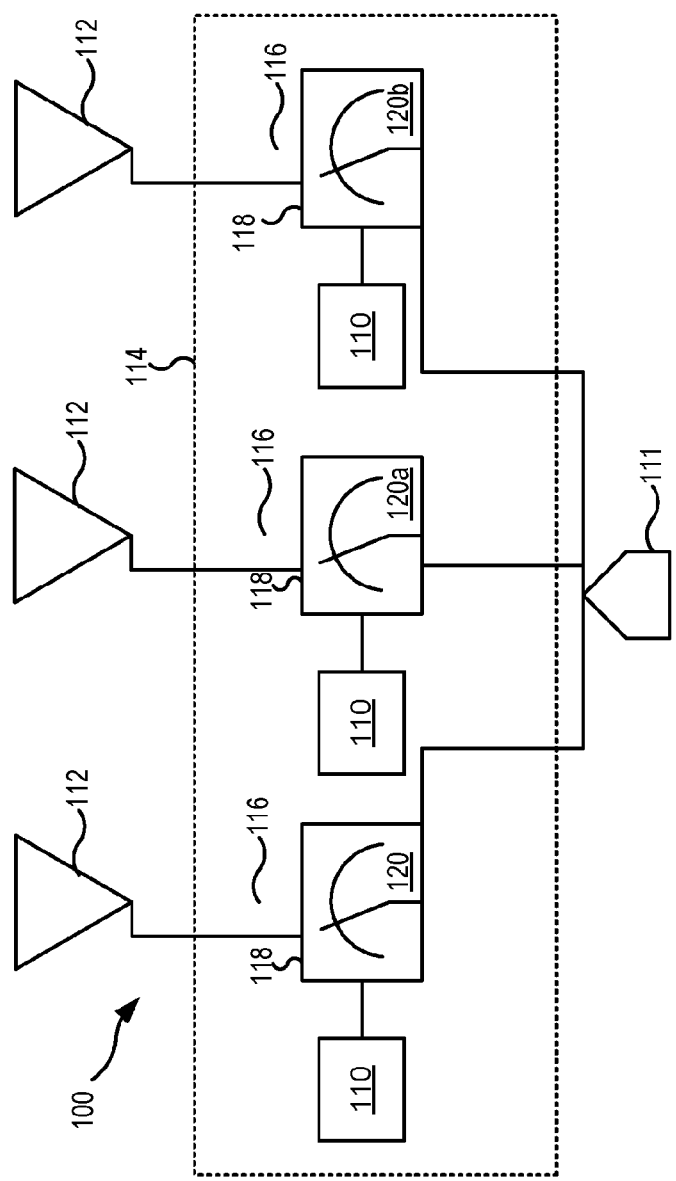
FIG. 3 is a schematic diagram of a panel antenna including a feed network that can be controlled by a gearbox system according to some embodiments.

A second rotating wiper-type phase shifter 120a may be provided alongside the first rotating wiper-type phase shifter 120a. The second rotating wiper-type phase shifter 120a is connected to separate transmission lines 116a and inputs 111a. The second rotating wiper-type phase shifter 120a may be controlled by a separate linkage shaft (not shown). For example, referring to FIG. 3, a base station antenna system may include multiple phase shifters 120, 120a, 120b that are controlled by a plurality of mechanical positioning systems 110.

Embodiments of the inventive concepts provide a gearbox actuator that is capable of controlling a plurality of settings for a single or multiple antenna system.

In particular, a gearbox system according to some embodiments includes a motor that drives a drive shaft that includes a plurality of gear linkages. The gear linkages are arranged along the drive shaft in a linear array. Each of the gear linkages includes a moving gear connected to the drive shaft and a fixed gear connected to a respective output shaft. Each of the output shafts may be used to control a setting, such as phase shift, elevation angle, azimuth, etc., of one or more antennas.

The moving gear in each gear linkage is spring-biased so that it is normally disengaged from the fixed gear. Each of the gear linkages on the first drive shaft further includes a mechanical switch that selectively engages the respective linkage by pushing the moving gear into engagement with the fixed gear, causing the respective output shaft connected to the fixed gear to rotate in response to rotation of the drive shaft. That is, in each gear linkage, the mechanical switch may be rotated to push a moving gear on the first drive shaft into engagement with a fixed gear connected to the output shaft.

A linear actuator is provided in proximity to the first drive shaft, and includes a switch block including a nut that that is driven by rotation of the second drive shaft, and a cam attached to the nut. The switch block selectively actuates the mechanical switch of one of the gear linkages on the drive shaft to cause the moving gear of the linkage to engage the fixed gear of the linkage. In this manner, a single gearbox system according to embodiments of the inventive concepts may be used to replace a number of gearbox actuators, which may significantly reduce the cost and/or complexity of a RET antenna system.

Figure 4:
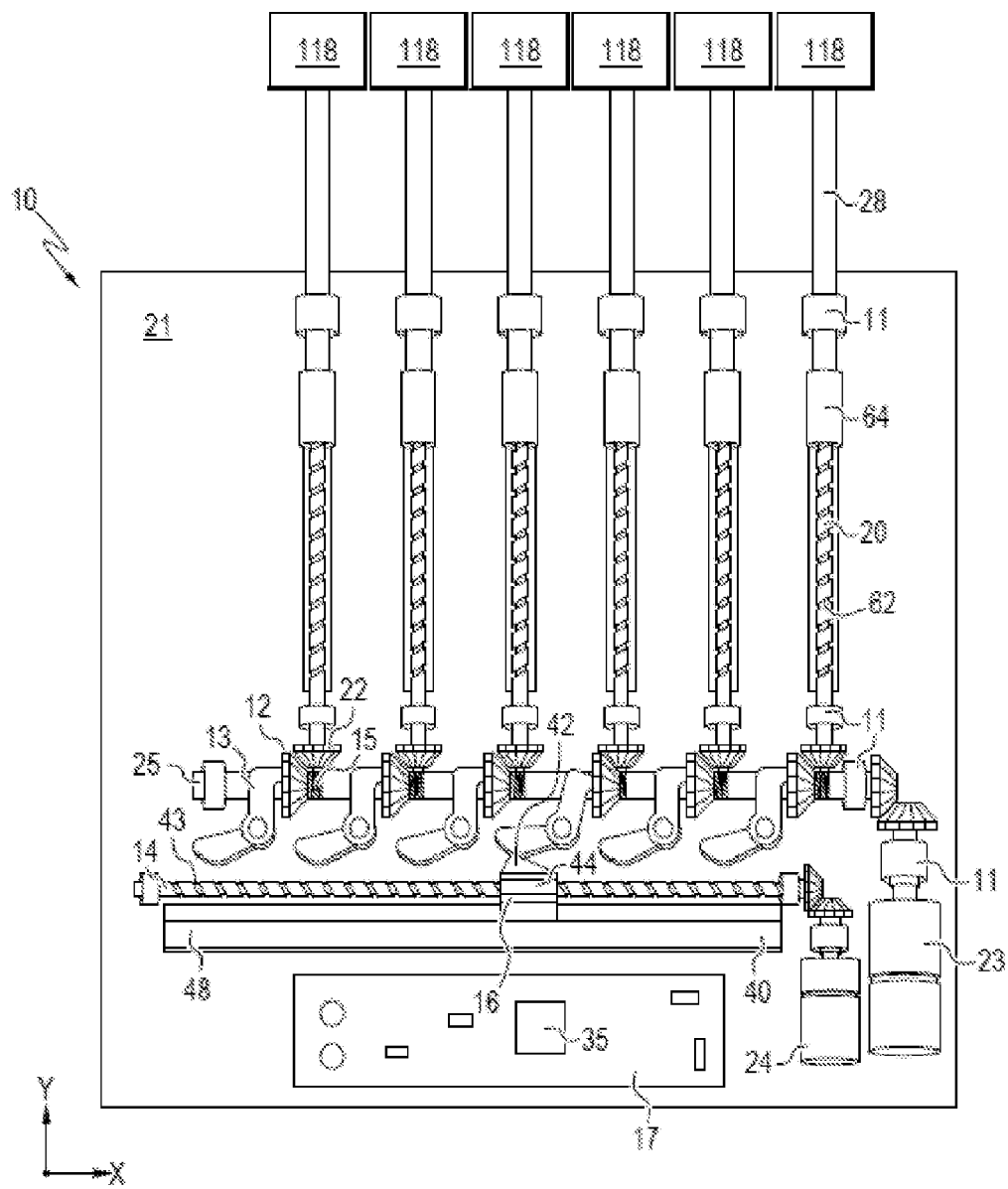
FIG. 4 is a schematic diagram of a gearbox system according to some embodiments.
Figure 5:
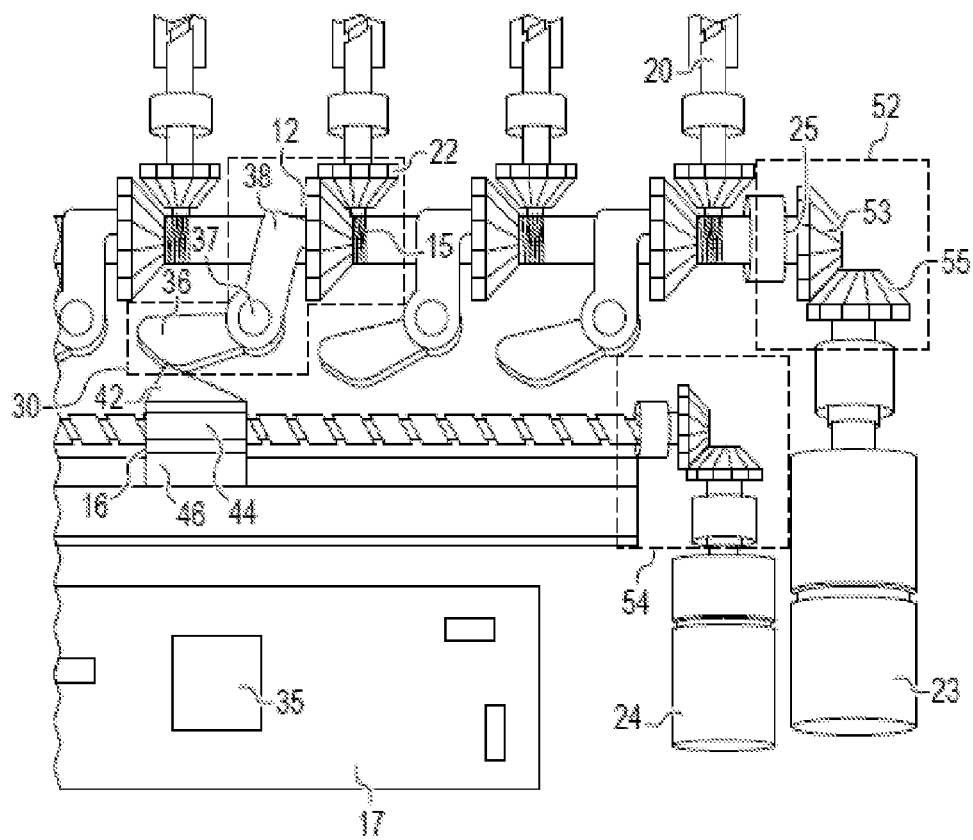
FIG. 5 is a detail view of a portion of a gearbox system according to some embodiments.

FIG. 4 is a schematic diagram of a gearbox system according to some embodiments, and FIG. 5 is a detail view of a portion of a gearbox system according to some embodiments.

Referring to FIG. 4 and FIG. 5, a gearbox system 10 according to some embodiments includes a base 21 that provides mechanical support for the system. The base 21 may be mounted in an enclosure (not shown) that provides environmental protection to the system 100.

A drive shaft 25 is mounted on the base 21 by means of a plurality of support bearings 11 that position the drive shaft 25 away from the base while allowing the drive shaft 25 to rotate about an axis of rotation. The drive shaft 25 is aligned in a first direction, illustrated as the horizontal, or x-axis, direction in FIGS. 4 and 5. It will be appreciated, however, that the orientation of the first direction is arbitrary, and that the actuator system 100 may in general be positioned in any desired orientation.

The drive shaft 25 is coupled to a drive motor 23 through a gear coupling 52 including a first gear head 53 coupled to the drive shaft 25 and a second gear head 55 coupled to an output shaft of the drive motor 23. The drive motor 23 is controlled by an electronic motor controller 35 that is positioned on a printed circuit board (PCB) 17 affixed to the base 21.

A plurality of gear linkages 30 are provided on the drive shaft 25. In particular, the gear linkages 30 may be spaced apart along the drive shaft 25 in the first direction at regular intervals. In the illustrated embodiment, six gear linkages 30 are provided on the drive shaft 25. However, it will be appreciated that a gearbox system according to various embodiments may include any practical number of gear linkages.

The gearbox system 10 further includes a plurality of output shafts 20 that are adjacent respective ones of the gear linkages 30. In the illustrated embodiment, six output shafts 20 corresponding to the six gear linkages 30 are provided adjacent the drive shaft 25. However, it will be appreciated that the gearbox system 10 may include any practical number of output shafts 20. The output shafts 20 may extend in a second direction, illustrated in FIG. 4 as a vertical, or y-axis, direction. It will be appreciated, however, that the orientation of the second direction is arbitrary, and that the output shafts may in general be oriented in any desired direction. Moreover, the output shafts 20 need not all be oriented in the same direction. The output shafts 20 are also held in position above the base 21 by means of support bearings 11 that allow the output shafts 20 to rotate about their respective axes of rotation.

Each of the gear linkages 30 includes a moving gear 12 that is slideably coupled to the drive shaft 25 so that it can move back and forth along the drive shaft 25 in the first direction. However, the moving gear 12 is attached to the drive shaft 25 in such a manner that the moving gear 12 rotates with the drive shaft 25 about the drive shaft axis in response to rotation of the drive shaft 25. Each of the gear linkages further includes a fixed gear 22 that is coupled to a respective one of the output shafts 20. In some embodiments, the fixed gear 22 may be affixed to the respective output shaft 20. In other embodiments, the fixed gear 22 may be coupled to the respective output shaft through a gear coupling (not shown).

The moving gear 12 in each gear linkage 30 is spring-biased by means of a spring 15 that urges the moving gear 12 away from the fixed gear 22, so that the moving gear 12 is normally disengaged from the fixed gear 22. Thus, unless the moving gear 12 is physically moved into engagement with the fixed gear 22 in opposition to the force exerted by the spring 15, rotation of the drive shaft 25 will not cause rotation of the output shaft 20.

Each of the gear linkages 30 on the drive shaft 25 further includes a mechanical switch 13 that selectively engages the respective gear linkage 30 by pushing the moving gear 12 into engagement with the fixed gear 22. When the moving gear 12 is placed into engagement with the fixed gear 22, the respective output shaft 20 connected to the fixed gear 22 will rotate in response to rotation of the drive shaft 25. In some embodiments, the mechanical switch 13 is configured to rotate to push the moving gear 12 on the drive shaft 25 into engagement with the fixed gear 22 that is coupled to the output shaft 20.

Each of the output shafts 20 may be a screw shaft that includes a helical land or groove 62 therein. A nut 64 may be provided on the screw shaft 20 and may engage the helical land or groove 62 such that the nut 64 moves back and forth along the linear direction in which the output shaft 20 is oriented in response to rotation of the output shaft 20. A linkage shaft 28 is connected at one end to the nut 64 and at the other end to variable element 118 that controls a setting of an antenna, such as the phase shift, downtilt angle, azimuth or beam width of a base station antenna, in response to linear movement of the linkage shaft 28. In some embodiments, the variable element 118 may include a phase shifter 120 as shown in FIG. 2. The variable elements 118 may control feed elements in a single antenna and/or in multiple antennas.

A linear actuator 40 is provided in proximity to the first drive shaft 25. The linear actuator 40 selectively positions a switch block 16 adjacent a selected one of the mechanical switches 13 to actuate the selected mechanical switch 13. That is, the linear actuator 40 moves the switch block 16 back and forth along the first direction. When the switch block 16 is moved into proximity with the mechanical switch 13 of a gear linkage 30, the switch block 16 pushes against the mechanical switch 13, which causes the gear linkage 30 to engage. That is, the switch block 16 selectively actuates the mechanical switch 13 of a selected one of the gear linkages 30 on the drive shaft 25 to cause the moving gear 12 of the gear linkage 30 to engage the fixed gear 22 of the gear linkage 30 that is coupled to an output shaft 20.

In particular embodiments, the linear actuator 40 may include a switch screw 14 including a helical land or groove 43 therein. The switch block 16 may include a nut 44 positioned on the switch screw 14 and a cam 42 attached to the nut 44 and extending towards the drive shaft 25. When the switch screw 14 is rotated, the switch block 16 may responsively move in a linear direction along the axis of rotation of the switch screw 14. The cam 42 protrudes from the switch block 16 to engage respective ones of the mechanical switches 13 as the switch block 16 moves along the axis of the switch screw 14 in response to rotation of the switch screw 14.

The linear actuator 40 may further include a linear guide 48 positioned in proximity to the switch screw 14, and the switch block 16 may include a guide fin 46 that engages the linear guide 48, so that when the switch screw 14 is rotated, the switch block 16 moves along the direction of the linear guide 48.

A switch motor 24 is provided on the base 21 and drives the rotation of the switch screw 14 through a switch gear coupling 54. The switch motor 24 may also be controlled by the motor controller 35 on the PCB 17.

Each of the mechanical switches 13 may include a first arm 36 that extends toward the switch screw 14, a second arm 38 adjacent the moving gear 12, and a pivot axis 37 between the first arm 36 and the second arm 38. The first arm 36 and the second arm 38 are provided in a fixed angular relationship to one another and are configured to rotate together about the pivot axis 37. When the cam 42 contacts the first arm 36 of a mechanical switch 13, the mechanical switch 13 rotates about the pivot axis 37, causing the second arm 38 to push against the moving gear 12 of the mechanical switch 13 and urging the moving gear 12, against the bias force exerted by the spring 15, into engagement with the fixed gear 22 of the gear linkage 30.

In this manner, any of the gear linkages 30 can be selectively engaged in response to positioning of the switch block 16 in response to rotation of the switch screw 14 by the switch motor 24 in response to a control signal output by the motor controller 35. Once a selected one of the gear linkages 30 is engaged in this manner, the output shaft 20 connected to the selected gear linkage 30 can be rotated by the drive motor 23, causing the respective linkage shaft 28 to move along the axis of the output shaft 20 and thereby changing a setting of the antenna to which the linkage shaft is connected.

Figure 6:
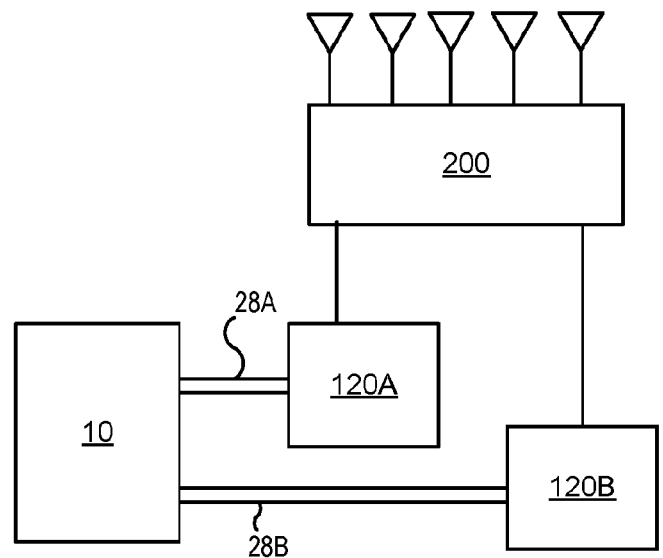
FIG. 6 is a schematic diagram illustrating attachment of a gearbox system according to some embodiments to an antenna.
Figure 7:
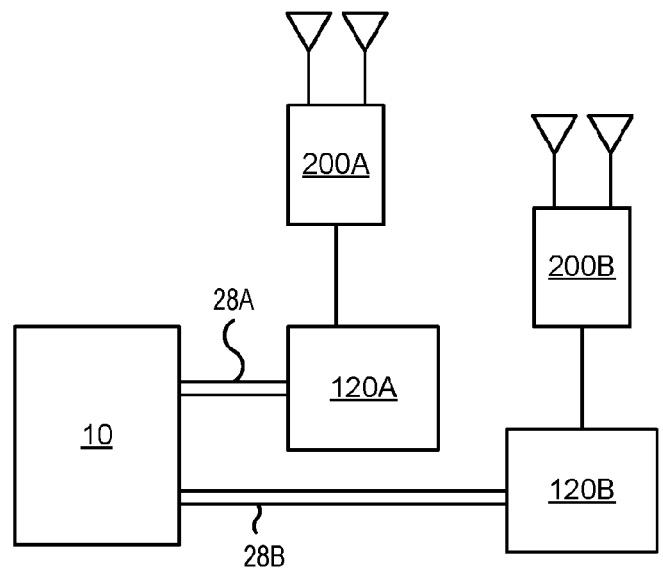
FIG. 7 is a schematic diagram illustrating attachment of a gearbox system according to some embodiments to a multi-antenna system.

FIG. 6 is a schematic diagram illustrating attachment of a gearbox system according to some embodiments to an antenna, and FIG. 7 is a schematic diagram illustrating attachment of a gearbox system according to some embodiments to a multi-antenna system. In particular, FIG. 6 illustrates a gearbox system 10 from which two linkage shafts 28A, 28B protrude. The linkage shafts 28A, 28B are connected to phase shifters 120A, 120B of a base station antenna 200, such that motion of the linkage shafts 28A, 28B controls respective settings of the base station antenna 200. FIG. 7 illustrates a gearbox system 10 from which two linkage shafts 28A, 28B protrude. The linkage shafts 28A, 28B are connected to phase shifters 120A, 120B respective base station antennas 200A, 200B, such that motion of the linkage shafts 28A, 28B controls settings of the respective base station antennas 200A, 200B.

The foregoing is illustrative of the present inventive concepts and is not to be construed as limiting thereof. Although exemplary embodiments of the inventive concepts have been described, those skilled in the art will readily appreciate that many modifications are possible in the exemplary embodiments without materially departing from the novel teachings and advantages of the inventive concepts. Accordingly, all such modifications are intended to be included within the scope of the inventive concepts as defined in the claims. The inventive concepts are defined by the following claims, with equivalents of the claims to be included therein.

What is claimed is:

1. An actuator gearbox, comprising:
   a drive shaft extending in a first direction and comprising a plurality of gear linkages that are spaced apart along the drive shaft in the first direction; and
   a plurality of output shafts adjacent respective ones of the plurality of gear linkages;
   wherein each of the plurality of gear linkages comprises:
      a fixed gear coupled to a respective one of the plurality of output shafts;
      a moving gear that is slideably coupled to the drive shaft, wherein the moving gear is movable along a first axis of the drive shaft and rotates about the first axis in response to rotation of the drive shaft,
      a mechanical switch adjacent the moving gear; and
      a bias spring coupled to the moving gear and configured to urge the moving gear out of engagement with the fixed gear;
   wherein the mechanical switch is configured to move the moving gear into engagement with the fixed gear to thereby cause the one of the plurality of output shafts to rotate in response to rotation of the drive shaft.

2. The actuator gearbox of claim 1, further comprising:
   a linear actuator adjacent the drive shaft; and
   a switch block coupled to the linear actuator;
   wherein the linear actuator is configured to move the switch block in the first direction to selectively actuate one of the plurality of mechanical switches.

3. The actuator gearbox of claim 2, wherein each of the mechanical switches comprises a first arm proximate the linear actuator, a second arm proximate the moving gear and a pivot axis between the first arm and the second arm.

4. The actuator gearbox of claim 3, wherein the switch block comprises a cam configured to push the first arm toward the drive shaft when the switch block is positioned adjacent the first arm by the linear actuator, and wherein second arm is configured to push against the moving gear when the first arm is pushed toward the drive shaft by the cam to urge the moving gear into engagement with a respective one of the fixed gears.

5. The actuator gearbox of claim 2, wherein the linear actuator comprises a switch screw that includes a helical groove therein, and wherein the switch block comprises a nut that is positioned on the switch screw and that engages the helical groove on the switch screw so that when the switch screw is rotated, the nut moves along the first direction.

6. The actuator gearbox of claim 5, wherein the linear actuator comprises a linear guide that guides the nut in the first direction when the switch screw is rotated.

7. The actuator gearbox of claim 5, further comprising a drive motor coupled to the drive shaft through a drive shaft gear linkage and a switch motor coupled to the switch screw through a switch screw gear linkage.

8. The actuator gearbox of claim 7, further comprising a motor controller on a printed circuit board coupled to the drive motor and the switch motor and configured to control the drive motor and the switch motor.

9. The actuator gearbox of claim 1, wherein each of the plurality of output shafts comprises:
   a lead screw including a second helical groove therein;
   a second nut on the output shaft that engages the second helical groove on the lead screw so that when the output shaft is rotated, the second nut moves along a second direction that is different from the first direction; and
   a linkage shaft coupled to the second nut.

10. The actuator gearbox of claim 1, further comprising a base, wherein the drive shaft and the plurality of output shafts are mounted to the base by a plurality of support bearings.

11. A base station antenna system, comprising:
   a base station antenna; and
   an actuator gearbox comprising:
      a drive shaft extending in a first direction and comprising a plurality of gear linkages that are spaced apart along the drive shaft in the first direction;
      a plurality of output shafts adjacent respective ones of the plurality of gear linkages, wherein at least one of the plurality of output shafts is coupled to the base station antenna, wherein at least one setting of the base station antenna is controlled in response to motion of the at least one of the plurality of output shafts;
   wherein each of the plurality of gear linkages comprises:
      a fixed gear coupled to a respective one of the plurality of output shafts;
      a moving gear that is slideably coupled to the drive shaft, wherein the moving gear is movable along a first axis of the drive shaft and rotates about the first axis in response to rotation of the drive shaft,
      a mechanical switch adjacent the moving gear; and
      a bias spring coupled to the moving gear and configured to urge the moving gear out of engagement with the fixed gear;
   wherein the mechanical switch is configured to move the moving gear into engagement with the fixed gear to thereby cause the one of the plurality of output shafts to rotate in response to rotation of the drive shaft.

12. The base station antenna system of claim 11, wherein the at least one setting of the base station antenna comprises a phase shift, downtilt angle, an azimuth angle and/or a beam width of the base station antenna.

13. The base station antenna system of claim 11, wherein the base station antenna comprises a first base station antenna, the base station antenna system further comprising:
   a second base station antenna, wherein a second one of the plurality of output shafts is coupled to the second base station antenna and wherein at least one setting of the second base station antenna is controlled in response to motion of the second one of the plurality of output shafts.

14. The base station antenna system of claim 13, wherein the at least one setting of the second base station antenna comprises a phase shift, downtilt angle, an azimuth angle and/or a beam width of the second base station antenna.

15. An actuator gearbox, comprising:
- a drive shaft extending in a first direction and comprising a plurality of gear linkages that are spaced apart along the drive shaft in the first direction;
- a motor coupled to the drive shaft;
- a motor controller coupled to the motor;
- a linear actuator adjacent the drive shaft; and
- a switch block coupled to the linear actuator;
- wherein each of the plurality of gear linkages comprises:
- an output gear;
- a moving gear that is slideably coupled to the drive shaft, wherein the moving gear is movable along a first axis of the drive shaft and rotates about the first axis in response to rotation of the drive shaft; and
- a mechanical switch adjacent the moving gear;
- wherein the mechanical switch is configured to move the moving gear into engagement with the output gear to thereby cause the output gear to rotate in response to rotation of the drive shaft; and
- wherein the linear actuator is configured to move the switch block into contact with the mechanical switch to selectively actuate the mechanical switch.

16. The actuator gearbox of claim 15, wherein each of the mechanical switches comprises a first arm proximate the linear actuator, a second arm proximate the moving gear and a pivot axis between the first arm and the second arm.

17. The actuator gearbox of claim 16, wherein the switch block comprises a cam configured to push the first arm toward the drive shaft when the switch block is positioned beneath the first arm by the linear actuator, and wherein the second arm is configured to push against the moving gear when the first arm is pushed toward the drive shaft by the cam to urge the moving gear into engagement with a respective ones of the fixed gears.

18. The actuator gearbox of claim 15, wherein the linear actuator comprises a switch screw that includes a helical groove therein, and wherein the switch block comprises a nut that is positioned on the switch screw and that engages the helical groove on the switch screw so that when the switch screw is rotated, the nut moves along the first direction.

19. The actuator gearbox of claim 18, wherein the linear actuator comprises a linear guide that guides the nut in the first direction when the switch screw is rotated.

20. The actuator gearbox of claim 15, further comprising a plurality of output shafts adjacent respective ones of the plurality of gear linkages, wherein the output gears are affixed to respective ones of the plurality of output shafts.

* * * * *